Jan. 1, 1929.
G. CAMPBELL
1,697,344
MEASUREMENT AND REGULATION OF FLOW OF STEAM OR OTHER FLUID
Filed July 6, 1926 2 Sheets-Sheet 2
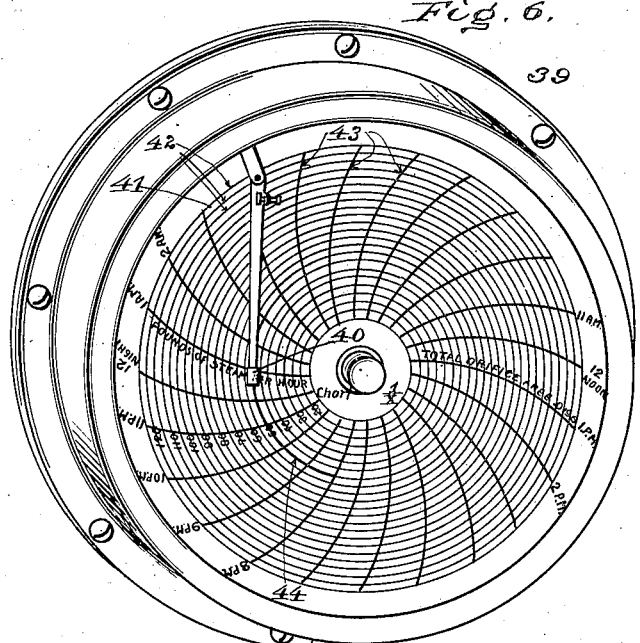
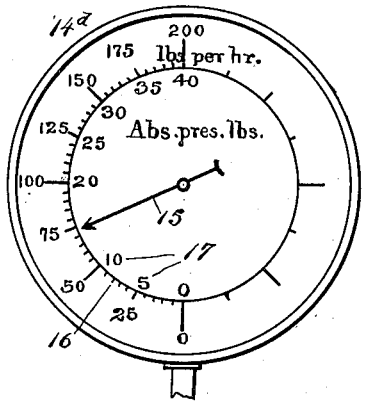
INVENTOR
Grant Campbell
BY Rogers, Kennedy & Campbell
ATTORNEYS.

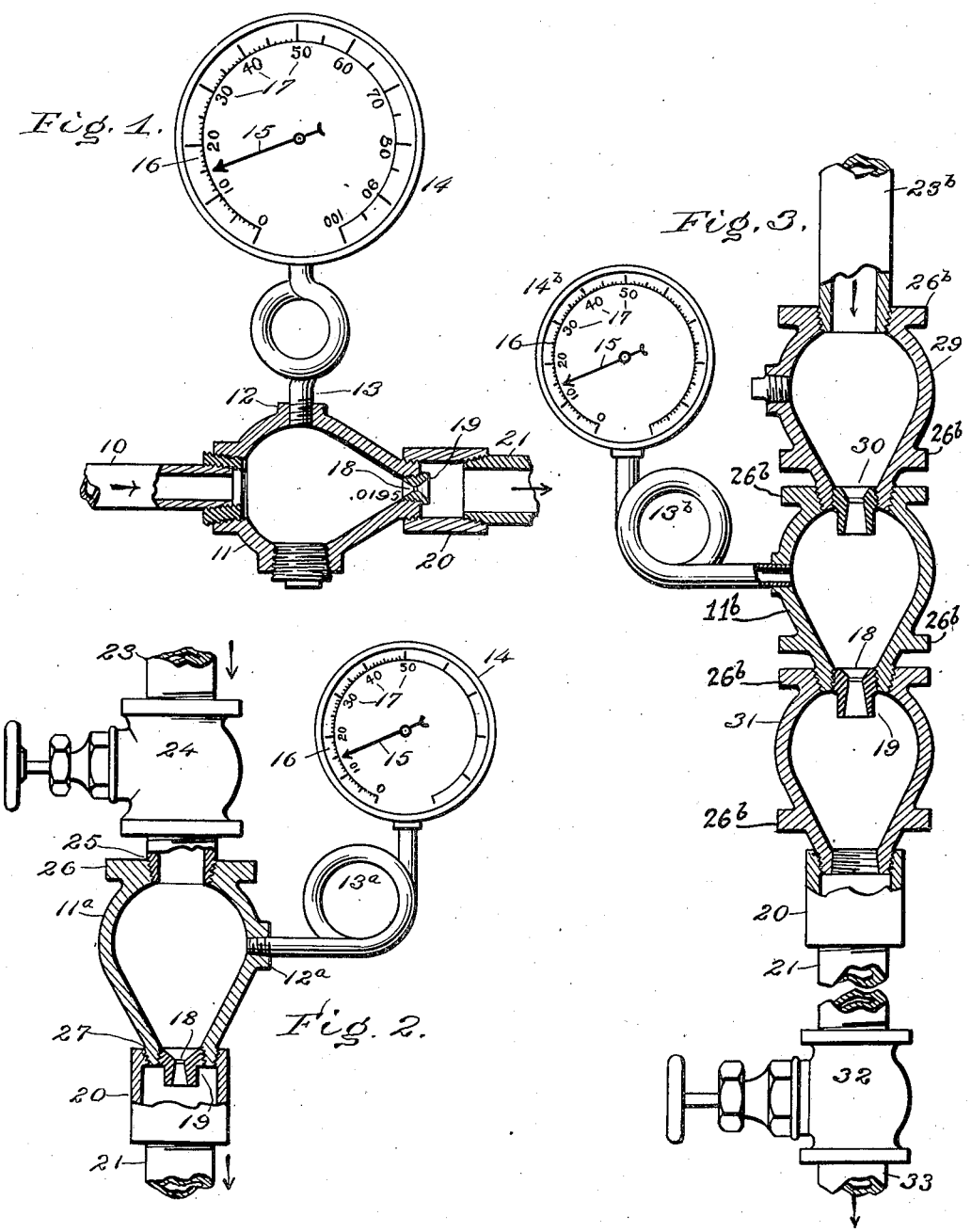

Patented Jan. 1, 1929.

1,697,344

UNITED STATES PATENT OFFICE.

GRANT CAMPBELL, OF SHORT HILLS, NEW JERSEY, ASSIGNOR TO CAMPBELL ENGINEERING COMPANY, OF SHORT HILLS, NEW JERSEY, A CORPORATION OF NEW JERSEY.

MEASUREMENT AND REGULATION OF FLOW OF STEAM OR OTHER FLUID.

Application filed July 6, 1926. Serial No. 120,691.

This invention relates to the measurement and regulation of flow of steam or other elastic fluid, and involves a novel system, and novel features of method and apparatus, whereby the rate of flow, referring particularly to weight, but in volume if desired, per unit of time is indicated or gaged and may be adjusted to a desired rate; for example, in the case of steam, dealing with flow in pounds per hour, in accordance with the common practise in the industries. The invention has reference particularly to the measurement or regulation of flow of an elastic fluid or gas, represented herein by dry saturated steam, although it will be understood that the principles are applicable for the measurement of other fluids. By measurement is meant the mere indicating or metering of the rate of flow by any indicating device or gage, and by regulating is meant the intentional or useful varying or adjusting of the rate of flow by the aid or under the control of the flow measuring or indicating device or gage.

The invention has a wide field of utility, and has been successfully employed for example where steam, having a high initial or boiler pressure, is desired to be delivered to a receiving vessel or system at a substantially lower pressure, wherein the steam is utilized for example in carrying out a process such as the refining of oils. The invention applies more particularly to cases where the flow of the fluid or steam is from a higher pressure to a lower pressure not more than 58% of the higher pressure. Another industrial application of the invention is to indicate the rate of consumption of steam by some process or apparatus, for example, a low pressure vessel located remote from a central point. Other uses will be mentioned hereinbelow and further ones will suggest themselves.

The general object of the invention is to afford a system or means of measurement or gaging of the rate of flow of steam or other elastic fluid which will be not merely efficient and substantially accurate, but simple, durable and convenient of use and operation. Further and more particular objects and advantages will be explained in the hereinafter following description of several embodiments of the invention, or will be apparent to those skilled in the subject. To the attainment of the objects and advantages referred to the present invention consists in the novel system of measurement and regulation of flow of steam or other fluids, and the novel features of method, apparatus, operation, arrangement, combination and detail herein illustrated or described.

This application is in part a continuation of my prior application Serial Number 36,928, filed June 13, 1925 for orifice element and system and methods and apparatuses utilizing the same; Figs. 2 and 3 hereof for example corresponding with Figs. 8 and 7 respectively of said prior application.

In the accompanying drawings Fig. 1 is a more or less diagrammatic view partly in side elevation and partly in central section of a simple form of apparatus illustrating the principles of the present inventon.

Fig. 2 is a similar view of a different embodiment containing the features shown in Fig. 1 combined with other features, as will be more fully explained.

Fig. 3 is a smaller view showing a further modification or application of the invention.

Fig. 4 is a similar view showing a further modification or application of the invention.

Fig. 5 shows a gage dial or face that may be used with the Fig. 4 gage.

Fig. 6 shows a recording gage which may be substituted for the mere indicating gage, for example of Fig. 4.

In one aspect this invention, in the disclosed embodiment, is based upon the law that when an elastic fluid such as dry steam or gas is discharged through an orifice from a higher to a lower pressure, the lower pressure being not more than 58% of the higher pressure, referring to absolute pressures, the rate of flow through the orifice is a direct function of, or varies directly with, the degree of the higher pressure and the effective area of the orifice; for example in the case of steam the flow in pounds per second substantially equals the higher absolute pressure in pounds per square inch, multiplied by the orifice area in square inches, divided by 70; and the pounds of steam flowing per hour will be 3600 times this figure.

According to the present invention, in its basic form, an orifice is used, taking the case of steam, having an effective area of .0195 square inch approximately, (e. g. circular diameter .1566 inch) this giving the result that by merely gaging the pressure preceding the orifice by means of a pressure gage graduated to indicate absolute pressure in pounds per square inch, the indication of pressure at any time gives also the existing rate of steam flow in pounds per hour. Thus, applying the above rule, when the higher pressure is 100 pounds absolute, the flow will be 100 × .0195 × 3600 ÷ 70, or 100 pounds per hour, the flow reading thus equaling the pressure reading, as stated. The identical graduation marks or divisions show, both the pressure and the flow rate.

Such simple embodiment is illustrated in Fig. 1, and it affords a mere measurement or gaging, without means of adjusting the flow. The high pressure or inlet pipe 10 delivers the steam or other fluid to the orifice element or unit 11, which is a chambered vessel with bulging walls affording substantial capacity. This pressure chamber is shown formed with a boss 12 at one side tapped to receive a pipe or connection 13 to a pressure gage 14. The high steam pressure may vary, and the gage, by its index or pointer 15, will at all times indicate the existing pressure in the chamber. The gage may have the usual graduations or division marks 16 in connection with a series of indicating numbers 17 by which the pressure readings are taken. It is to be understood that the gage differs from the ordinary pressure gage in that it is set to read absolute pressure, or approximately 14.7 pounds per square inch greater than the usual gage readings; and the usual gage may be altered for this purpose by setting the dial relatively back, or the index finger forward, so as to indicate substantially 14.7 under atmospheric pressure, as shown on Fig. 1.

The combination is completed by the provision of an orifice 18, formed preferably in a removable orifice piece or nozzle 19 mounted at the outlet end of the pressure chamber, and a suitable coupling or union 20 connecting the chamber outlet to a passage or discharge pipe 21 leading to any desired point or apparatus.

In this embodiment the orifice 18 has an effective discharge area or opening of .0195 square inch. It is preferably shaped with a tapered approach to the throat and a flared getaway, as indicated, the throat being scientifically bored or reamed to the exact size required. The orifice however may be formed in other ways. By the word orifice it is not intended to limit the element to a single aperture, so long as there is the effect of a single aperture of the area stated, the purpose being to permit the outflow of the steam with a restrictive effect, giving progressive escapement to a place of lower pressure.

With the described embodiment the reading of the gage 14 gives directly the absolute pressure and at the same time gives directly the existing rate of flow in pounds per hour. As an apparatus the disclosure combines the pressure chamber through which the steam flows, the pressure gage graduated to indicate the absolute pressure therein, and a restricted discharge or orifice outlet from the chamber of such character or area that the rate of flow is readable on the pressure graduations of the gage. If instead of a simple pressure gage there be used a recording gage the record of absolute pressure therein will at the same time constitute a record of the rate of flow in pounds per hour as it may vary from time to time, and thus give the means of determining the total weight of steam passing through the pressure chamber in any given period of time.

Fig. 2 shows an embodiment wherein a means is introduced ahead of the pressure chamber and gage by which the initial or boiler pressure can be reduced, and the rate of flow can be regulated. Thus the initial or boiler pipe 23 is shown as leading to a suitable valve, such as a globe or throttle valve 24, from which leads the pressure pipe 10$^a$ to the orifice unit or element 11$^a$ corresponding substantially with Fig. 1. By reducing the steam pressure ahead of the gage a more advantageous working pressure for the gage may be obtained and at the same time the expansion operates to evaporate any contained moisture, so that only dry steam will pass from the pressure chamber to the orifice. Preliminary reduction of pressure may be effected by one or more successive orifices, or, if constant pressure and flow are desired, notwithstanding variability of initial pressure, by an automatic reducing valve. By having a valve 24 adjustable manually, however, the total rate of steam flow may be regulated at will to any desired amount under guidance of the gage acting as a flow indicator.

In this embodiment the orifice unit 11$^a$ is shown of generally pear shape with a threaded entrance 25 surrounded by a flange or hexagonal bead 26 facilitating the assembly of the parts; while the lower end of the unit may be formed with an exit 27 having interior and exterior threads, the orifice piece 19 being screwed into the interior thereof while the exterior is engaged by an outlet coupling 20 as in the case of Fig. 1. The orifice nozzle can be placed at any point in the line of flow. A pigtail tube 13$^a$ is shown connecting the chamber with the gage 14.

This embodiment is useful in oil refining, and for various other purposes, for example, in gas ovens or furnaces, where pressure or temperature is to be regulated, and properly proportioned quantities of gas and air or other fluids are to be fed to the burners or other points of delivery.

The features disclosed in Fig. 2 which are not in Fig. 1 are considered novel per se, and intended to be claimed irrespective of their combined use with the features shown in Fig. 1; and this applies to Fig. 3 and other figures below described.

Fig. 3 shows an embodiment wherein the regulation of rate of flow may be effected at a point beyond the pressure chamber and gage, this arrangement to be employed when the pressure drop through the orifice following the gage is to a pressure not over 58% of that in the pressure chamber. The figure also illustrates the employment of an orifice as a means of preliminary reduction of pressure between the source and the pressure chamber, and illustrates the use of an orifice system comprising several orifices in tandem, with the gage pressure taken off at a suitable point in advance of the final orifice. The main orifice unit or pressure chamber 11$^b$ is connected by pigtail tube 13$^b$ with gage 14$^b$ as before. Preceding these elements is an orifice unit 29 containing an orifice 30 delivering into the pressure chamber 11$^b$; and preceding the unit 29 is an initial pressure pipe 23$^b$ leading from the boiler or source. Each of the several orifice elements is shown as having two hexagonal flanges or beads, 26$^b$, one at each end, to facilitate assemblage. The orifice member 18 which cooperates with the pressure gage is mounted in the unit 11$^b$ and discharges into a succeeding unit 31, which may or may not contain an additional orifice member, and which is connected by a coupling 20 to an outlet pipe 21 as before. The controlling valve 32 is located at the far end of this pipe and delivers by the final outlet pipe 33 to the point of use of the delivered steam.

This embodiment is useful in cases where any apparatus is to be supplied with low pressure steam from a high pressure source or boiler, the regulating valve being usually near the apparatus consuming the steam. When no steam is being drawn the gage will indicate the full boiler pressure, but when the distant valve 32 is opened the gage will show, not merely the reduced pressure in the chamber 11$^b$ but the rate of steam flow to the distant point, the orifice member 18 being of the predetermined area stated. The preliminary orifice 30 is useful as without it the full boiler pressure will continue up to the second orifice. The first orifice acts as a variable pressure reducer, bringing the pressure to a moderate figure. When the initial pressure is very high the number of orifices may be increased to three or four or more so as to give the desired pressure reduction, and the gaging of the rate of flow may be taken at any point in the system so long as the steam passing from that point next traverses an orifice of the proper area into a pressure not more than 58% of the gaged pressure. This applies in cases where the critical pressure ratio is 100 to 58, and the invention is operative where the absolute pressure ratio is substantially not higher than the critical ratio below which the rate of flow is proportional to the higher absolute pressure without respect to the lower pressure.

In a case, such as Fig. 3, where tandem orifices are employed, they may usefully be of progressively increasing areas; for example if each orifice is about 72% greater than the preceding, the percentage of pressure drop will be about the same at each point, and will be 42% in amount, or to a pressure 58% of the preceding, thus ensuring the operativeness of the flow measuring system wherever the gage be applied.

Fig. 4 is a further embodiment in which several additional features are disclosed, which may be employed jointly or separately. Thus where an orifice of size .0195 square inch is inadequate to carry the intended flow the invention may be employed as at the lower side of Fig. 4 with an orifice of a simple multiple of that size, for example .0972, enabling the absolute pressure gage to indicate the rate of flow by multiplying the readings by the simple factor 5; or in some cases by adding to the same pressure graduations on the dial the multiplied set of numbers indicating the flow. The arrangement would be the equivalent of five orifices of the base or key size .0195 delivering into the same outlet. Fig. 4 shows also the principle of supplying two or more different points of consumption with steam from the same pressure chamber, under observation or control of the same gage. In some cases it may be desirable to supply unequal rates of flow to two different points, with correctly proportioned rates to each, and Fig. 4 illustrates this in employing the key size orifice .0195 at the upper side and the multiplied orifice .0972 at the lower side, both drawing from the pressure chamber but delivering steam or other fluid to the points of consumption in the exact proportion of one to five, and in quantities observable on the pressure graduations of the pressure gage.

The initial pressure pipe 23 may deliver through a throttle valve 24 and pressure pipe 10 to an orifice unit 11$^c$ having a pigtail connection 13$^c$ to a gage 14$^c$. At the upper side the pressure chamber discharges through an element or union 35 containing an orifice nozzle 36 which in turn discharges into passages 37 leading to one point of consumption. At the lower side of the chamber discharges to an element 35$^c$ containing an orifice nozzle 36$^c$ which discharges into passages 37$^c$ leading to another point of consumption. The upper orifice may be .0195 and the lower one .0972 square inches in effective area. With this arrangement the gage indicates the existing pressure in the chamber 11$^c$ and the several outlets will draw from the chamber of that pressure. The flow through the upper orifice 36 will be at a rate indicated directly by the pressure reading on the gage whereas the flow through the lower orifice 36$^c$ will be at a simple multiple of that rate, namely five times the indicated gage pressure; in each case the identical graduations of the dial serving for indication of both pressure and rate of flow.

The Fig. 4 embodiment is useful for many purposes, for example, introducing steam to a plurality of sprays in continuous oil stills, or the like, for which use the two orifices 36 and 36ᶜ will usually be equal, and the pipes 37 and 37ᶜ leading to the sprays, under regulation of valve 24, by which the rate of flow is adjusted to the desired figure. A former element of uncertainty in continuous still work is thus removed, and the positive control of the amount of steam delivered makes for economy in steam and fuel consumption as well as uniformity of process and product. A similar embodiment, or one like Fig. 1 but with a throttle valve ahead of the gage, is useful for steam lifts, operating to deliver steam for transferring hot oil from one still to another.

The dial 14ᶜ, when used with an orifice of .0972 area, will have the usual absolute pressure graduations, and may bear only the pressure numbers, the multiplying factor 5 being indicated by an inscription such as "steam flow in 5 lbs. per hour." Or the same marks may have two sets of numbers, as shown in Fig. 5, one giving the pressure, the other the flow; and if only the flow readings are inscribed the pressure is readily known by dividing by the factor 5, since the identical graduations apply to both.

Fig. 6 shows a pressure gage of the recording kind which may be used with any of the disclosed embodiments, for example in Fig. 4. The gage for example may be the well known Bristol recording gage 39 supporting a pen or stylus 40 which traces the record, while internal clockwork rotates the dial or chart 41, which is removable or interchangeable. As the pen swings outwardly across the successive circles 42 it indicates increase of pressure in the orifice chamber, and these circular graduations on the chart may be numbered to represent the absolute pressure, or the rate of flow, or both. The successive curved radii 43 of course indicate the hours of the day and night, so that the rate of flow at any time as traced by the record line 44 can be ascertained by reference to the proper hour radius. When the multiple size orifice is used as at the lower side of Fig. 4 it is convenient to inscribe upon the recording chart the proper multiples of the pressure, so as directly to read the flow on the pressure graduation lines, the pressures in that case being immediately determinable by dividing by the given factor, such as 5.

The practical use of this invention is highly convenient, as is also the supplying of apparatus for any given conditions, and the testing and calibrating of apparatus; all of which are separately performed. For example where in the same plant, department, or system there is need for a wide range of flow indication and regulation, requiring several different orifice combinations, the gaging or recording instruments can all be identical and can be interchangeable, and can be calibrated and tested by the No. 1 or unit ratio or direct reading chart or dial; whereas in the industrial use of the apparatus the operatives are not concerned with the calibration, and frequently not with the pressure indication but only with the reading of rate of flow, and the regulation and recording of flow rate. The department of adjustment or repair has merely to select the proper orifice or orifices for the total multiple appropriate for each use and supply the corresponding dial or chart. This need not concern those using the apparatus in the field, and the operations are thus kept distinct, while a great variety of uses is readily covered with a minimum change of apparatus, an orifice piece and a chart.

The calibrated orifice pieces are preferably numbered according to their area No. 1 being the base or key area .0195, No. 2 twice that area, etc. When a total flow of say 25 times the unit is desired it is not necessary to use a No. 25 orifice, as the combination of a No. 10 and No. 15 in parallel will give the result.

The herein disclosed system of gaging and regulating flow is found in practise to be not merely simple, convenient, inexpensive and durable, but highly accurate, namely to a fraction of 1% of error; which is much closer than the ability of an operative to effect adjustment by observation. The immediate response of the gage to the adjustment enhances accuracy. The ready and reliable capacity to secure at will a given rate of flow avoids waste and excess, and thereby brings about substantial economies in steam and fuel besides the other advantages enumerated.

There has thus been described particular methods and apparatuses for the measurement, and thereby for the regulation, of flow of steam or other fluid, embodying the principles of the invention; but since many matters of method, apparatus, operation, arrangement, combination and detail may be variously modified without departing from such principles it is not intended to limit the invention to such matters except so far as specified in the appended claims.

What is claimed is:

1. Apparatus for measuring the rate of flow of gas from a higher into a lower pressure, where the absolute pressure ratio is substantially not higher than that critical pressure ratio (as 100 to 58) below which rate of flow is proportional to the higher absolute pressure irrespective of the lower pressure, said apparatus comprising a pressure chamber through which the gas flows at the higher pressure, and a pressure gage connected thereto having its graduations based upon the absolute pressure in the chamber and expressed in force units per area unit, (as pounds per square inch); the chamber having a restrictive outlet of such predetermined character or area that the rate of gas flow through the chamber and outlet, in quantity units per time unit, (as pounds per hour), is readable upon the pressure graduations of the gage.

2. Apparatus for measuring the rate of flow of gas from a higher into a lower pressure, where the absolute pressure ratio is substantially not higher than the critical pressure ratio of about 100 to 58 below which the rate of flow is proportional to the higher absolute pressure irrespective of the lower pressure, said apparatus comprising a pressure chamber through which the gas flows at the higher pressure, and a pressure gage connected thereto having its graduations laid out to correspond to the absolute pressure in the chamber and expressed in force units per area unit, the chamber having an outlet orifice of effective area such that the rate of gas flow through the chamber and outlet, in quantity units per time unit, is readable upon the pressure graduations of the gage.

3. Apparatus for measuring the rate of flow of dry steam from a higher into a lower pressure, where the absolute pressure ratio is substantially not higher than the critical pressure ratio of about 100 to 58, said apparatus comprising a pressure chamber through which the gas flows at the higher pressure, and a pressure gage connected thereto having its graduations based upon the absolute pressure in the chamber and expressed in pounds per square inch, the chamber having a restrictive outlet of such predetermined character that the rate of gas flow through the chamber and outlet, in pounds per hour, is readable upon the pressure graduations of the gage.

4. Apparatus as in claim 3 and wherein the outlet consists of an orifice of effective area of about .0195 square inch multiplied by an integer.

5. Apparatus for measuring and regulating the rate of flow of gas from a higher into a lower pressure, where the absolute pressure ratio is substantially not higher than that critical pressure ratio below which rate of flow is proportional to the higher absolute pressure irrespective of the lower pressure, said apparatus comprising a pressure chamber through which the gas flows at the higher pressure, a pipe connecting the initial pressure source with the chamber, a valve interposed in the pipe for taking down and regulating the pressure in the chamber and thereby the rate of flow, under guidance of the gage next recited, and a pressure gage connected with the chamber having its graduations based upon the absolute pressure in the chamber and expressed in pressure units per area unit, the chamber having a restrictive outlet of such predetermined character that the rate of gas flow through the chamber and outlet, in quantity units per time unit, is readable upon the pressure graduations of the gage.

6. Apparatus as in claim 1 and wherein the pressure chamber is provided with a plurality of separate restrictive outlets bearing a simple relation to each other and delivering to separate passages for measured distribution of gas to different points all under indication by the same pressure gage.

7. Apparatus as in claim 5 and wherein the pressure chamber is provided with separate restrictive orifice outlets of different effective areas bearing a predetermined simple ratio to each other, delivering the gas at proportioned rates to separate passages all under indication by the same gage and regulation by the same valve.

8. Apparatus for measuring and regulating the flow of gas comprising a regulating valve delivering to a pressure chamber, such chamber, a pressure operated gage connected with such chamber and adapted to indicate the absolute pressure therein, said chamber having a plurality of restrictive outlets of different effective areas, which are such that the respective rates of flow through the outlets will each be expressible as an integral multiple of the gage indication, when the ratio of the absolute pressure in the chamber to that of the passage, into which the flow is directed, is not greater than the critical pressure ratio, said outlets delivering to separate passages.

In testimony whereof, I have affixed my signature hereto.

GRANT CAMPBELL.